US008468697B2

(12) United States Patent
Tochon et al.

(10) Patent No.: US 8,468,697 B2
(45) Date of Patent: Jun. 25, 2013

(54) METHOD FOR PRODUCING A HEAT EXCHANGER SYSTEM, PREFERABLY OF THE EXCHANGER/REACTOR TYPE

(75) Inventors: Patrice Tochon, Uriage (FR); Raphael Couturier, Sassenage (FR); Fabien Vidotto, Fontaine (FR)

(73) Assignee: Commissariat a l'Energie Atomique et aux Energiest Alternatives (FR)

( * ) Notice: Subject to any disclaimer, the term of this patent is extended or adjusted under 35 U.S.C. 154(b) by 148 days.

(21) Appl. No.: 12/998,150

(22) PCT Filed: Sep. 21, 2009

(86) PCT No.: PCT/EP2009/062212
§ 371 (c)(1),
(2), (4) Date: Mar. 22, 2011

(87) PCT Pub. No.: WO2010/034692
PCT Pub. Date: Apr. 1, 2010

(65) Prior Publication Data
US 2011/0173813 A1 Jul. 21, 2011

(30) Foreign Application Priority Data
Sep. 23, 2008 (FR) ...................................... 08 56389

(51) Int. Cl.
B21D 39/06 (2006.01)
(52) U.S. Cl.
USPC .................................. 29/890.038; 29/890.03
(58) Field of Classification Search
USPC ......... 29/890.03, 890.054, 890.038; 228/183, 228/193, 194, 248.1, 248.5
See application file for complete search history.

(56) References Cited

U.S. PATENT DOCUMENTS

| 3,363,037 | A | * | 1/1968 | Levey, Jr. et al. ................ 419/49 |
| 4,418,455 | A | * | 12/1983 | Cohn ......................... 29/889.722 |
| 4,676,305 | A | * | 6/1987 | Doty ............................ 165/158 |
| 4,677,724 | A | | 7/1987 | Kuroki |
| 5,292,056 | A | * | 3/1994 | Borchert et al. .............. 228/183 |
| 5,300,367 | A | * | 4/1994 | Bodart et al. ................. 428/586 |
| 5,467,528 | A | | 11/1995 | Bales et al. |
| 7,234,511 | B1 | * | 6/2007 | Lesage ............................ 165/69 |
| 7,749,464 | B2 | * | 7/2010 | Sakakura et al. ............. 422/211 |
| 7,998,345 | B2 | * | 8/2011 | Jia et al. ........................ 210/175 |
| 8,225,481 | B2 | * | 7/2012 | Kayser et al. ................... 29/557 |
| 2006/0266505 | A1 | * | 11/2006 | Lee et al. ...................... 165/166 |
| 2007/0246191 | A1 | * | 10/2007 | Behrens et al. .............. 165/80.4 |
| 2008/0148635 | A1 | * | 6/2008 | Bowe ........................... 48/127.7 |
| 2010/0307730 | A1 | * | 12/2010 | Chiang ........................ 165/185 |

FOREIGN PATENT DOCUMENTS

| EP | 0 191 602 | | 8/1986 |
| FR | 2796322 | A1 * | 1/2001 |
| GB | 2312737 | | 11/1997 |
| JP | 61-175487 | | 8/1986 |
| JP | 2006-263746 | | 10/2006 |
| JP | 2008-39255 | | 2/2008 |

* cited by examiner

Primary Examiner — David Bryant
Assistant Examiner — Justin Sikorski
(74) Attorney, Agent, or Firm — Baker & Hostetler LLP

(57) ABSTRACT

The invention relates to a method for producing a heat exchanger system comprising at least one module (1) traversed by a row of fluid circulation channels, the embodiment of said module being implemented as follows:
formation of an assembly (4) comprising, in parallel, a plurality of metal conduits (10) each forming, with the inner space thereof, one of the fluid circulation channels, the conduits being arranged between two metal plates (6, 6), the spaces defined by the directly consecutive conduits and said metal plates being filled by a metal filling substance (8), and the assembly also comprising connection elements (20) of the conduits; and
treatment of the assembly (4) so as to obtain diffusion welding of the conduits (10) with the substance (8), the plates and the elements (20).

8 Claims, 10 Drawing Sheets

METHOD FOR PRODUCING A HEAT EXCHANGER SYSTEM, PREFERABLY OF THE EXCHANGER/REACTOR TYPE

The invention relates generally to the field of heat exchangers, and preferentially to that of compact plate exchangers, for which the heat exchanges obtained are very satisfactory, due to the high ratio between the exchange surface areas and the exchanger volume.

The invention relates more specifically to heat exchanger systems comprising a module or a stack of modules forming, in alternation, along a plate stacking direction, a first fluidic circulation zone and a second fluidic circulation zone, and designed such that a chemical, optionally catalytic, reaction occurs, in at least one of said fluidic circulation zones. Thus, due to the chemical reaction encountered in at least one of these zones, such exchangers are also referred to as reactors. More generally, such heat exchangers are referred to as exchangers/reactors.

It is noted that numerous applications may be envisaged for this type of exchanger system, for example the production of chemicals or pharmaceuticals, or fuel cell installations.

As no production method has proved to be entirely satisfactory, this type of exchanger system is not widely used in industry.

In order to remedy this drawback, the invention relates to a method for producing a heat exchanger system comprising at least one module traversed by a row of fluid circulation channels, the embodiment of said module being implemented as follows:

formation of an assembly comprising, in parallel, a plurality of metal conduits each forming, with the inner space thereof, one of said fluid circulation channels, said conduits being arranged between two metal plates, and the spaces defined by the directly consecutive conduits and said metal plates being filled by a metal filling substance, said assembly also including two metal connection elements, one being provided with a plurality of through orifices respectively housing one of the two ends of the conduits, and the other being provided with a plurality of through orifices respectively housing the other of the two ends of the conduits; and treatment of said assembly so as to obtain diffusion welding of the conduits with said metal filling substance, with said plates, and with the two metal connection elements.

The module obtained advantageously has a very low sensitivity to corrosion problems, due to the absence of welds/solders in contact with the fluid to pass through the fluid circulation channels defined by this module. The service life of the exchanger system is increased for this reason.

Moreover, the module obtained is perfectly tight, particularly due to the diffusion welding of the elements present, giving rise to increased safety.

Furthermore, the method according to the invention easily enables the embodiment of modules of different geometries, selected according to the requirements encountered, particularly with respect to the desired heat exchange. It may for example involve the choice of diameter of the channels, or the shape thereof, giving rise to a noteworthy modularity of the method according to the invention.

Once said treatment has been carried out, the solid substance around the conduits defining the fluid circulation channels gives the exchanger system module a high thermal inertia, offering an high capacity to absorb the heat from an exothermic reaction, and thus offering satisfactory reliability and safety during subsequent use. For this reason, a module with the same design is likely to respond to a plurality of types of exothermic reactions.

Moreover, it is noted that the ability to use a metallic material with a high heat conductivity for the filling substance and the plates makes it possible to increase the overall heat conductivity of the exchanger system including such a module significantly, and thus dissipate the heat better.

Once the treatment operation has been carried out, the conduits, preferably straight tube, zigzag or any other shape deemed to be suitable, are embedded in the mass surrounding same, consisting of the filling substance and the metal plates. The module obtained, comparable to an integral structure, is thus capable of withstanding very high pressures and/or pressure differentials, such as several hundred bar, for example, without any risk of damage.

The production costs associated with the implementation of the method according to the invention remain advantageously low, essentially due to the low cost of each of the constituent elements of said assembly.

As mentioned above, said assembly is embodied so as to also include two metal connection elements, one provided with a plurality of through orifices respectively housing one of the two ends of the conduits and the other respectively housing the other of the two ends of the conduits. These two connection elements, for example each in the form of a bar, are dedicated to the inlet/outlet of the fluid in the module channels.

The implementation of said treatment thus gives rise to diffusion welding of the ends of the conduits with the respective connection elements thereof. Preferentially, welding of the ends in the associated orifices thereof is carried out prior to the treatment operation resulting in the diffusion welding of the elements present. These prior welds, preferably TIG type, are preferably impervious to the secondary vacuum, particularly to be able to withstand the subsequent treatment of the assembly.

Preferably, the material removal is carried out on one of the two metal connection elements between two directly consecutive orifices, so as to create a joining channel between these two orifices, and a closing plate is positioned on said connection element in question, to seal said joining channel between the two directly consecutive orifices. Overall, the resulting joining channel enables the fluidic connection of the two directly consecutive channels of the module respectively opening into one of the orifices in question. The fluid circulating in the first channel and arriving in the joining channel is then reversed before entering the second channel.

In this way, in a simple, inexpensive and flexible manner, it is possible to obtain a plurality of fluid distribution configurations via the module, based on various criteria selected such as the fluid residence time in the module, and the desired mixing and heat exchange levels.

On the closing plates, it is advantageously possible to fit one or a plurality of measuring instruments, in order for example to collect data relating to the temperature, pressure and/or pH. It is also possible, via these closing plates, to carry out an additional introduction of reagents, and/or clean the channel in the event of clogging or solidification. Finally, it is also possible, again via these closing plates, to add static mixers or any other insert required, particularly inserts coated with catalyst(s).

The material removal is preferably carried out by means of machining, suitable for implementation at any stage of the method, and preferentially after the assembly treatment operation.

In this way, it is possible to modulate the cross-section of the joining channel according to the depth of the machining carried out on the connection element. These consist of mixing and heat exchange properties which can thus be modified merely by adapting the depth of the machining carried out.

Naturally, any other solution reversing the fluid in the module may be envisaged, without leaving the scope of the invention.

Moreover, if the exchanger system has two stacked modules, each with a row of channels, such a joining channel may be obtained between a channel of the first module and a channel of the second module.

Preferably, said assembly is embodied so as to also include a consolidation casing wherein the rest of the assembly is inserted, and wherein the implementation of said treatment also results in the diffusion welding of said casing with the rest of the assembly. This casing is generally provided to ensure that the interfaces between the elements stacked therein are isolated from the outside, during the diffusion welding.

Preferentially, said heat exchanger system comprises, in one piece, at least one first and one second stacked modules, respectively traversed by a row of first fluid circulation channels and by a row of second fluid circulation channels, the embodiment of said first and second modules being implemented as follows:

formation of a first assembly comprising, in parallel, a plurality of first metal conduits each forming, with the inner space thereof, one of said first fluid circulation channels, said first conduits being arranged between two first metal plates, and the spaces defined by the directly consecutive first conduits and said first metal plates being filled by a first metal filling substance, and the formation of a second assembly comprising, in parallel, a plurality of second metal conduits each forming, with the inner space thereof, one of said second fluid circulation channels, said second conduits being arranged between two second metal plates, and the spaces defined by the directly consecutive second conduits and said second metal plates being filled by a second metal filling substance, said second assembly being stacked on the first assembly with the first metal plate and the second metal plate situated between the first and second conduits consisting of the same plate; and simultaneous treatment of said first and second stacked assemblies so as to obtain diffusion welding of the first conduits with said first metal filling substance and said first plates, and diffusion welding of the second conduits with said second metal filling substance and said second plates.

Naturally, one alternative could be that of producing the two modules independently, and subsequently stacking and assembling same.

Moreover, each of the first and second assemblies preferably comprises metal connection elements such as those mentioned above.

Furthermore, a design wherein the number of stacked modules is greater than two may still obviously be envisaged, or is even preferred.

Preferably, said treatment is a hot isostatic compression, or any other technique giving rise to the desired diffusion welding.

Preferably, said hot isostatic compression is carried out at a temperature of approximately 1040° C., at a pressure of approximately 1200 bar, for approximately 2 hours.

Preferentially, the conduits are made of stainless steel and the metal filling substance and said plates of an alloy with a high heat conductivity. However, other metals and/or alloys may be used, depending on the type of chemical reaction carried out.

For example, said metal filling substance, before said assembly treatment step, is made of metal powder. In this case, it is thus preferentially made such that the powder is consolidated during the treatment operations. Obviously, one alternative consists of providing a solid substance, formed for example of strips defining spaces for housing the conduits between each other.

Preferably, at least one of the fluid circulation channels is equipped with an insert, preferably made of metal, coated at least partially with a catalyst enabling a catalytic chemical reaction inside said channel.

Further advantages and features of the invention will emerge in the non-limitative detailed description hereinafter.

This description will be made with reference to the appended figures wherein.

Figure 1:
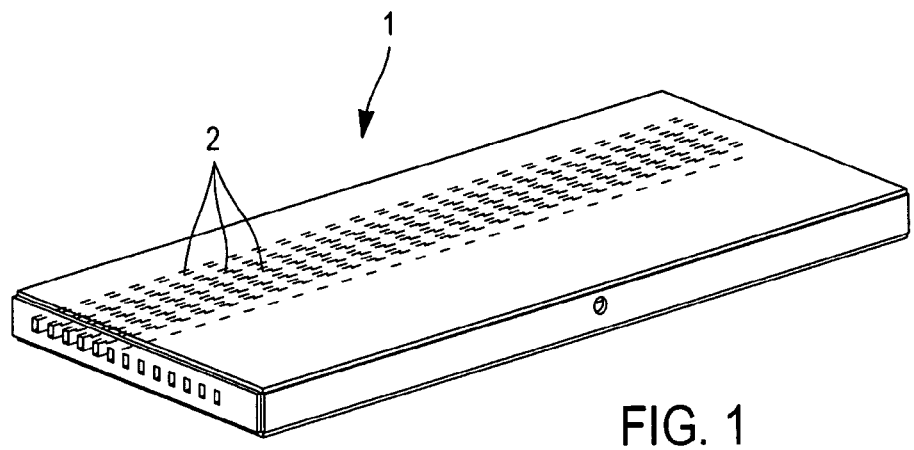
FIG. 1 represents a schematic perspective view of a fluidic circulation modules obtained following the implementation of the method according to a preferred embodiment of the present invention.

With reference to FIG. 1, a heat exchanger system module 1, preferably of the exchanger/reactor type, for example provided for producing chemicals or pharmaceuticals, can be seen. Typically, this module has a length in the region of 30 cm, a width in the region of 13 cm, and a thickness in the region of 2 cm. However, any type of design can be envisaged, and according to the application of the system.

The module 1, the specific production method of which for the present invention will be described hereinafter, has a substantially parallelepipedic, or plate, shape, traversed by a plurality of fluid circulation channels 2, preferably parallel and referred to as basic channels. Nevertheless, these channels 2 are not necessarily cylindrical as represented schematically by the dotted lines in FIG. 1, but may adopt any shape deemed to be suitable, such as the curved or zigzag shape described hereinafter. Furthermore, the cross-section of these channels 2 may also be adapted according to the requirements encountered.

Figure 2:
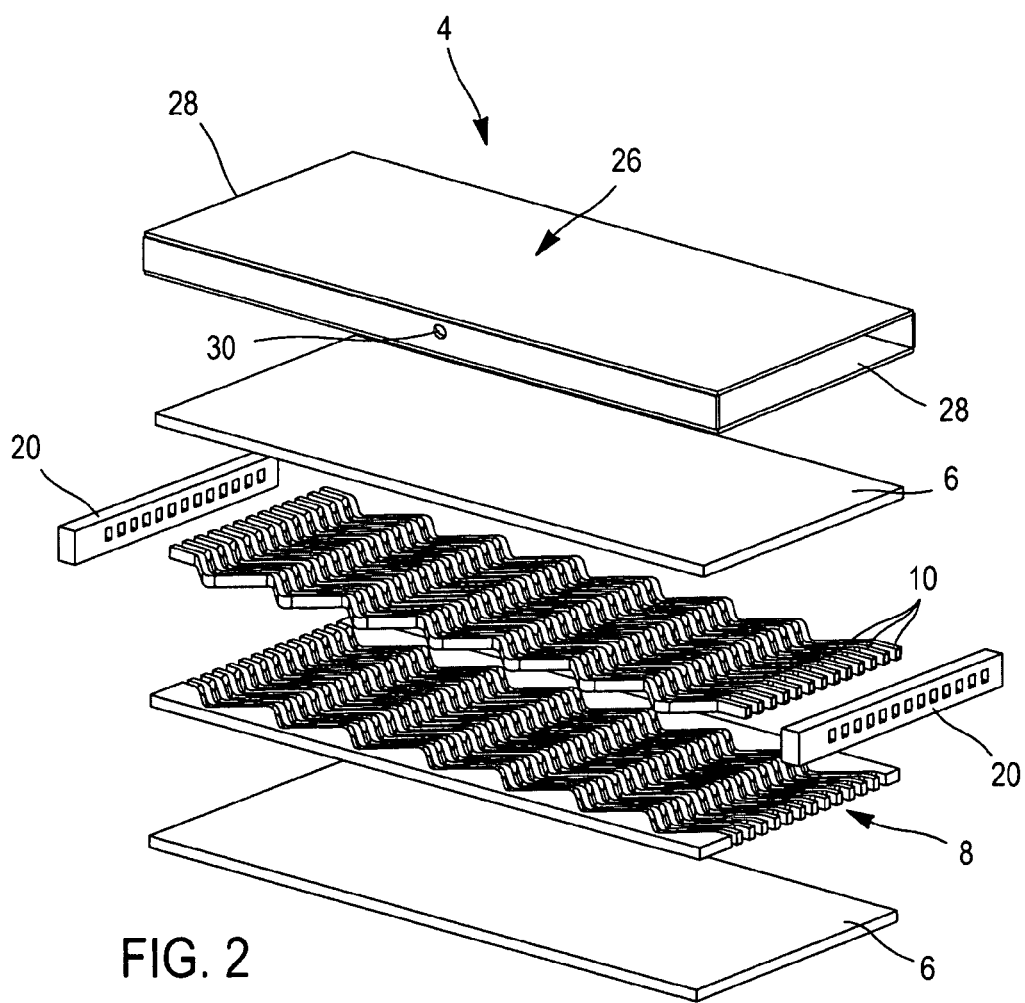
FIG. 2 represents an exploded perspective view of the assembly intended to form said module in FIG. 1, prior to the treatment thereof.

To produce said module 1, a stacked element assembly is first produced, said assembly being referenced generally with the reference 4 in FIG. 2.

The stack may be produced on a conventional substrate, preferably horizontal, whereon a metal plate made of alloy, preferably with a high heat conductivity, such as a copper-rich alloy, for example a CuCl alloy, is first positioned.

On the surface of said plate 6, a metal substance 8, referred to as the filling substance, made of the same material as the plate 6, is positioned, and defining spaces wherein the metal conduits 10 made of stainless steel, for example 316L stainless steel, are housed.

Figure 3:
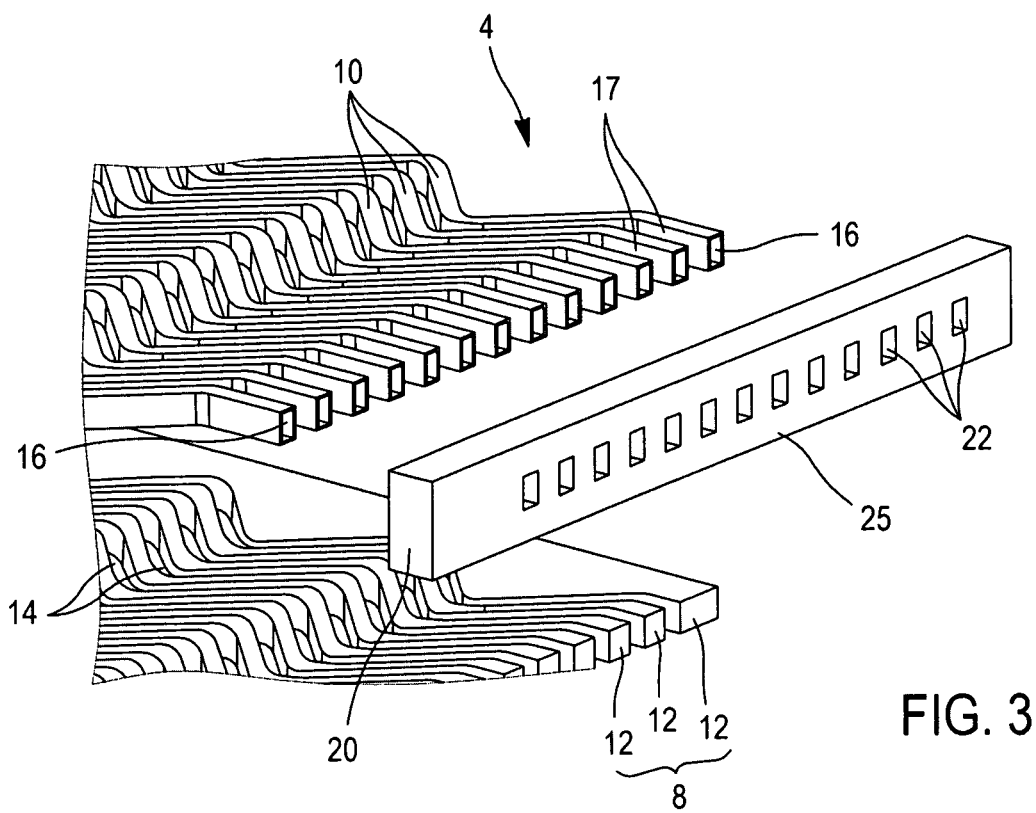
FIG. 3 represents an enlarged portion of the assembly shown in FIG. 2.

In FIG. 3, it can be seen that the substance 8 is preferably made of a plurality of strips 12 spaced from each other, between which the spaces formed 14 have a complementary geometry to that of the conduits 10, so as only to obtain a small gap between these elements once the conduits have been positioned on the plate 6, in dedicated spaces 14. The conduits 10, also referred to as tubes, have, in this instance, a curved or zigzag shape. They each form, with the inner space 16 thereof, one of the fluid circulation channels. The cross-section of said conduits 10 is rectangular, square, round or any other shape deemed to be suitable. In the example shown, the rectangular cross-section has a height of approximately 4 mm and a width of approximately 2 mm.

At the ends of the conduits 10, two bar-shaped connection elements 20 are situated, for example one for the fluid inlet, and the other for the fluid outlet. Each of these bars 20 is arranged at the end of the assembly 4, in a substantially crosswise manner with respect to the main direction of the conduits 10, i.e., subsequently, the main flow direction of the fluid through the module.

Figure 4:
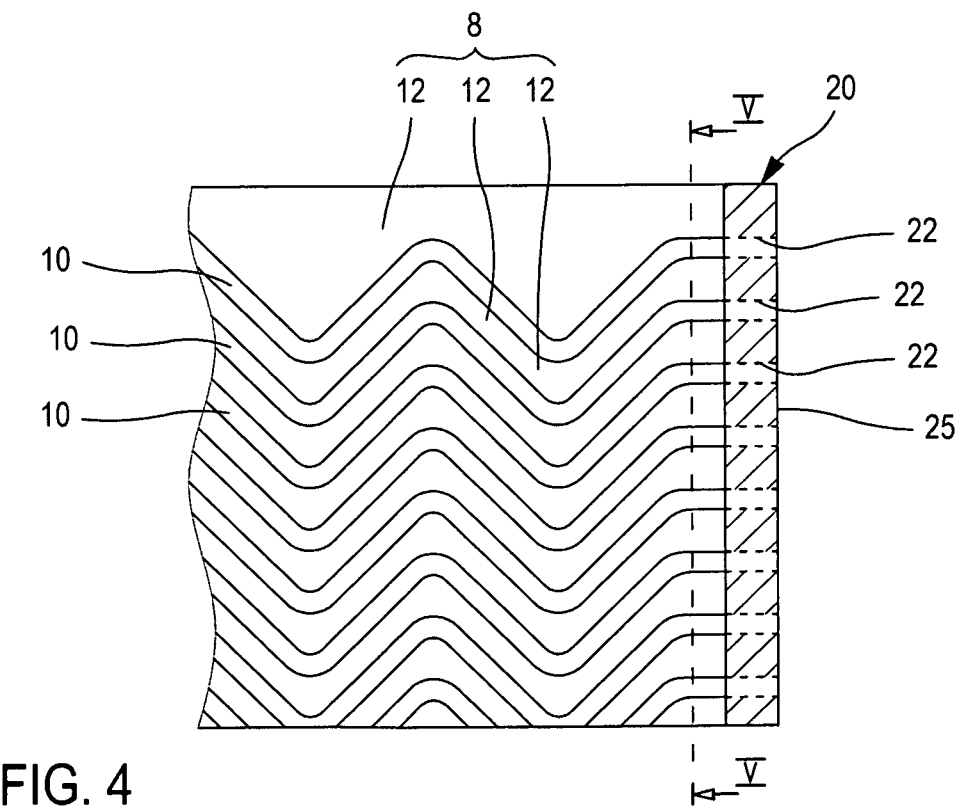
FIG. 4 represents a portion of the assembly shown in FIGS. 2 and 3, in a top view.

Again with reference to FIG. 3, each bar 20 has a plurality of through orifices 22, equal in number to that of the conduits, since each end of a conduit 10 is housed in one of the orifices 22. More specifically, the geometry of the orifices 22 is complementary to that of the ends of the conduits 10, so as only to obtain a small gap between these elements once the conduits have been inserted in the orifices 22 of both bars 20. As shown in FIG. 4, the ends of the conduits 10, represented with a dotted line, may be inserted in the orifices 22 until they have been filled entirely, i.e. until the edges thereof are flush with the outer surface 25 of the bar 20. An alternative could consist of only inserting these ends partially in the orifices 22, as envisaged on the representation in FIG. 7, described hereinafter. In any case, the edge of the conduit ends is preferentially welded in the associated orifice 22 thereof, along the entire periphery of said edge. These welds, preferably TIG type, are envisaged to be impervious to the second vacuum.

Figure 5:
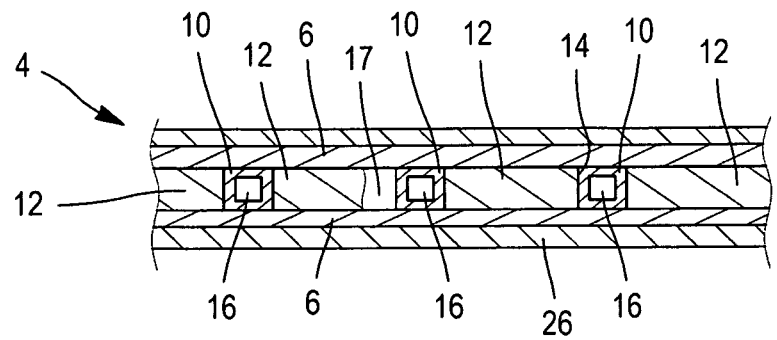
FIG. 5 is a sectional view along the line V-V in FIG. 4.

The thickness of the conduits 10 is substantially identical to that of the substance 8, so that they jointly form a plane substrate surface of another plate 6 substantially identical to the first, as shown in FIGS. 2 and 5. In the latter figure, it can thus be seen that the space between the two plates 6 is filled entirely by the substance and the conduits, with each space 17, defined in the stacking direction by the plates 6, and in the orthogonal direction of the bars by two directly consecutive conduits 10, filled by a strip 12 of the substance.

The thickness of the bars 20 is envisaged according to whether is it is covered by the plates 6 or not, given that the aim is to obtain a stack of uniform thickness. In this way, as an indication, if the plates 6 are tangential to the bars 20 without covering same, said bars have a thickness corresponding substantially to the sum of the thicknesses of the substance and of the two plates 6. Furthermore, these bars 20 also define, at the ends of the conduits 10, the abovementioned spaces 17.

This stack of uniform thickness is then inserted into a consolidation casing 26, closed over 360°, the inside whereof has a complementary shape to that of the abovementioned stack. As seen in FIG. 2, it has two opposite openings 28, at which the bars 20 are to be housed, respectively. In other words, the two bars close the two openings of the casing, as can be seen in the case of one on module 1 in FIG. 1.

Figure 6:
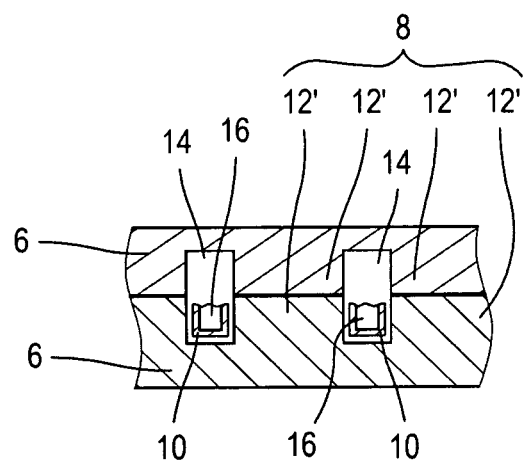
FIG. 6 represents a partial sectional view showing an alternative embodiment for the formation of the metal plates and the metal filling substance belonging to assembly to be treated.

In FIG. 6, an alternative embodiment for the formation of the metal plates 6 and the metal filling substance 8 can be seen. In this instance, the two plates 6 each fixedly support protruding projections 12', facing and in contact in pairs, said projections 12' forming the substance 8. The spaces 14 for housing the conduits are thus formed between the projections 12' and the plates 6. To produce each of the two portions of this stack, it is possible to start with a solid plate and machine it on one of the faces thereof in order to make the projections 12' apparent. In this respect, a further alternative could consist of providing the entire substance fixed on one of the two plates, preferably integral therewith, and with the other plate similar to those shown in the previous figures.

Finally, one option also consists of replacing the solid strips described above, by metal powder which would be consolidated during the subsequent treatment operation, described hereinafter.

The production of the module 1 is indeed continued by treating the assembly 4, preferably by means of hot isostatic compression. Before compression, degassing of the stack is carried out, by pumping via an orifice 30 made in the wall of the casing, as shown in FIG. 1. Once the degassing has been completed, the orifice 30 is sealed tightly, compression is carried out by applying a high pressure and temperature, i.e. at a temperature of approximately 1040° C. and at a pressure of approximately 1200 bar, for approximately 2 hours.

During this compression, the gaps are removed between the consecutive elements, and they undergo solid state welding, or diffusion welding.

Consequently, the conduits 10 are diffusion-welded to the strips 12, bars 20 and plates 6, the latter also being diffusion-welded to the strips 12, casing 26 and bars 20. Finally, the casing 26 is also diffusion-welded to the bars 20, such that an integral module is obtained, this so-called monolithic module corresponding to a solid block, for example multi-material, traversed by channels.

Also during this hot isostatic compression operation, the consolidation of the powder forming the substance is obtained, if such a powder is selected.

During the use of the module in a heat exchanger system, the fluid is for example conveyed by an intake line (not shown) positioned on either of the two bars 20, in order to distribute the fluid in each of the channels 2 formed by the inner space 16 of the conduits. The fluid circulates in the same direction in each of the parallel channels 2, before being discharged therefrom, and entering for example an exhaust line (not shown) positioned on the other bar 20.

Nevertheless, according to the desired mixing and heat exchange properties, it may be advantageous to circulate the fluid for a longer time in the module, for example by circulating same in one channel of the module along a first flow direction, and circulating same in another channel of said module before removing it therefrom, in a second flow direction opposite the first.

Figure 7:
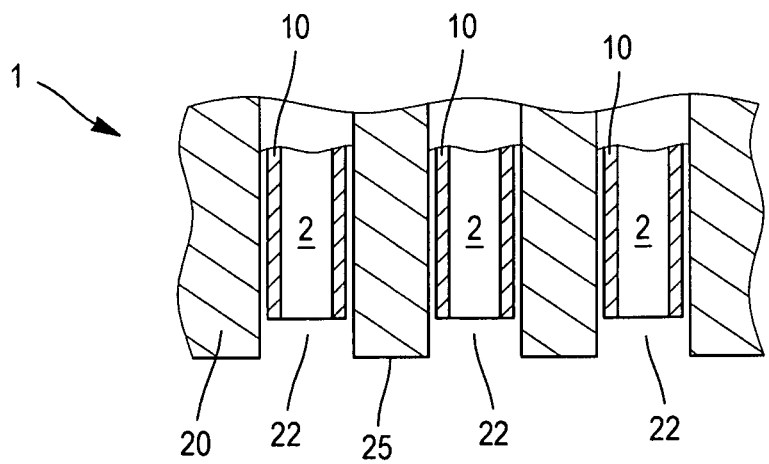
FIGS. 7 to 9 represent schematic views of the step for forming a joining channel between two parallel channels of the module.
Figure 8:
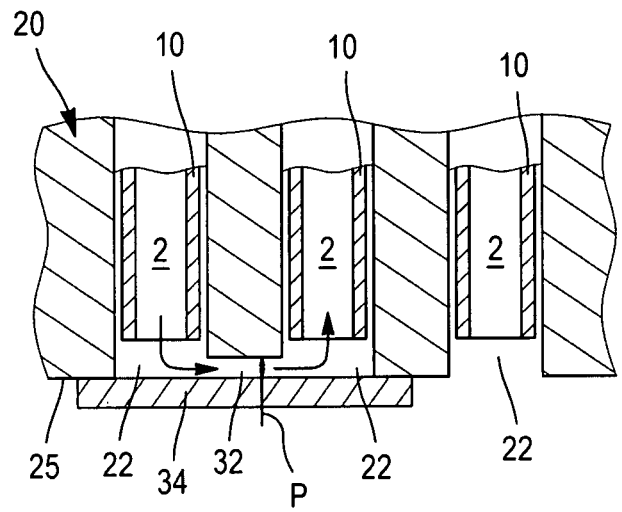
Figure 9:
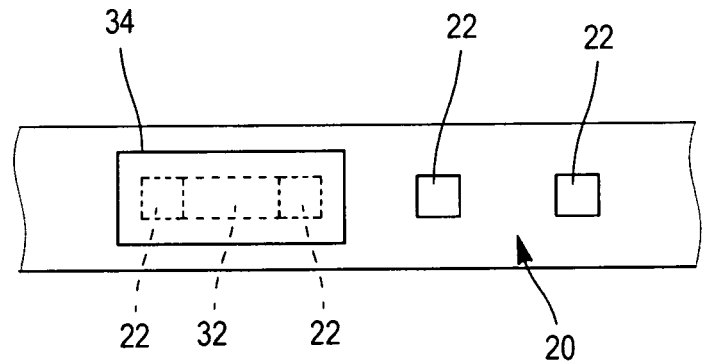

For this purpose, any means for fluid reversal may be used, although that described hereinafter with reference to FIGS. 7 to 9 is preferred.

In FIG. 7, the module 1 after the hot isostatic compression operation can be seen. As mentioned above, the example shown envisages that the ends of the conduits 10 do not fill the respective orifices 22 thereof of the bar 20 entirely.

The step will consist of joining the two orifices 22 on the left of the figure. For this purpose, machining of the portion of the bar 20 situated between two orifices in question is carried out, so as to obtain a joining channel 32 between same, as shown in FIG. 8. Obviously, the machining depth "P" is dependent on the desired joining channel size. In this way, according to the size of this joining channel 32, the mixing and heat exchange properties are impacted.

With reference to FIGS. 8 and 9, to seal said joining channel 32, a closing plate 34 is positioned, on the outer surface 25 of the bar 20, so as to cover the two orifices 22 in question and the joining channel 32, defined by the plate 34. The plate 34 is attached by any known manner, for example by welding or screwed elements. Furthermore, the material used to produce the plate 34 is preferably identical to that of the conduits 10 and the bar 20.

With such a design, in FIG. 8, the fluid arrives in a first circulation direction via the left channel 2, and is reversed while passing through the joining channel 32, which then conveys it into the consecutive channel 2, followed in a second circulation direction opposite the first. In this respect, it is indicated that, having reached the other end of said second channel, the fluid may either be withdrawn from the module 2, or be reversed a second time via the joining channel identical or similar to that described above, to subsequently follow a third channel in the first fluid circulation direction.

In the other case wherein the conduit ends fill the respective orifices thereof entirely, each joining channel should be produced by machining not only the bar between the two orifices in question, but also a portion of the two conduit ends.

One or a plurality of functions may be associated with the plate 34, using one or a plurality of measuring instruments, in order for example of collect data on the temperature, pressure and/or pH of the fluid passing through the channels. It is also possible, via said closing plate 34, to provide an additional reagent supply and/or carry out cleaning of the channels in the event of clogging or solidification. It is also possible to add static mixers or any other insert required, particularly an insert coated with one or a plurality of catalysts.

Finally, it is noted that any technique other than machining may be used to obtain the desired material removal, without leaving the scope of the invention.

Figure 10:
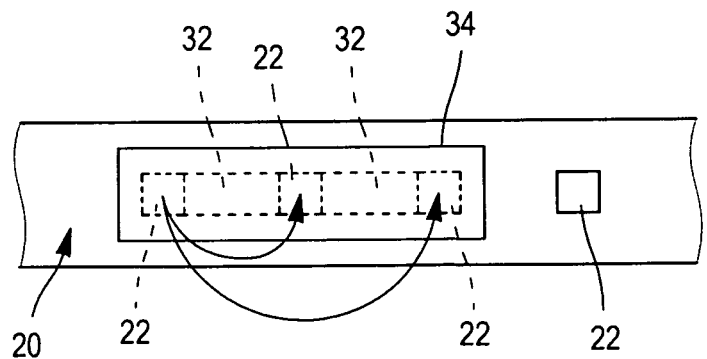
FIG. 10 represents an alternative embodiment wherein an orifice of the connection element is connected to the two orifices arranged directly consecutive in either side thereof, respectively by two joining channels.

FIG. 10 shows an alternative associated, with an orifice 22 of the bar 20, a first joining channel 32 connecting same to a directly consecutive orifice 22, and a second joining channel 32 connecting same to the other orifice 22 directly consecutive thereof. In this way, a single orifice 22 is connected to the orifices 22 arranged on either side thereof, preferentially consecutively, respectively by two joining channels 32, with these three orifices 22 and said two channels 32 covered by the same plate 34 providing tightness.

With such a design, the fluid from the left basic channel is reversed in parallel in the next two elementary channels, following the two joining channels 32 mentioned above.

Figure 11:
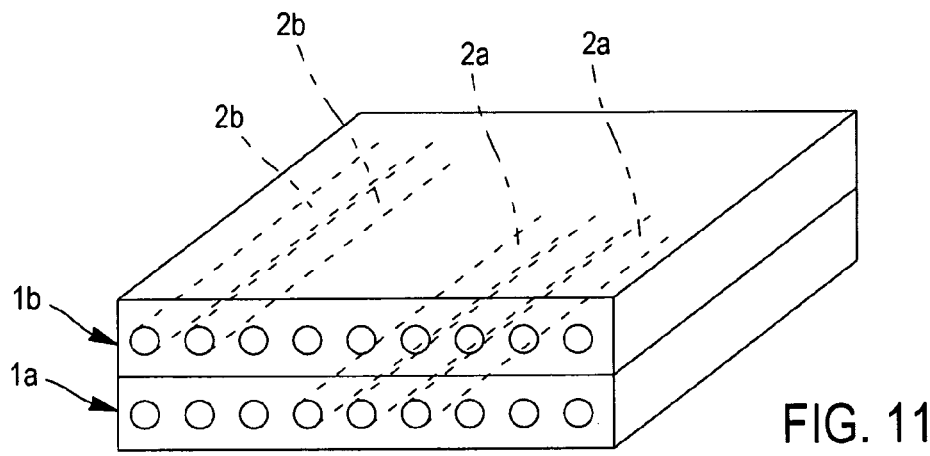
FIG. 11 represents a perspective view of two fluidic circulation modules obtained following the implementation of the method according to a further preferred embodiment of the present invention.

FIG. 11 represents a perspective view of two fluidic circulation modules 1$a$, 1$b$, obtained following the implementation of the method according to a further preferred embodiment of the present invention.

These two modules 1$a$, 1$b$, forming an integral assembly, respectively have a row of first parallel channels 2$a$, and a row of second parallel channels 2$b$. Overall, they consist of the stacking of two modules 1 as described with reference to the previous figures.

The first channels 2$a$ form a first fluidic circulation zone, whereas the second channels 2$b$ form a second fluidic circulation zone, one or each optionally being equipped with one or a plurality of catalysts enabling a catalytic chemical reaction in these zones. As mentioned above, these catalysts may take the form of a coating provided on an insert. This insert, due to the accessory function thereof, may advantageously be replaced during the lifetime of the exchanger system, and preferentially takes the form of a stainless steel or ceramic tube, coated with catalyst, which may take the form of a noble metal (Pt, Rh, Pd, etc).

Obviously, both separate fluids for circulating via the first and second modules 1$a$, 1$b$ respectively may be introduced in a concurrent, i.e. in the same circulation direction, or countercurrent flow. Another alternative consists of providing, in one or both modules, one or a plurality of reversals of fluid of the type described above.

To obtain these two modules, overall, stacked assemblies 4$a$, 4$b$ substantially identical to the assembly 4 described above are produced, respectively intended to form the two modules 1$a$, 1$b$. Indeed, with reference to FIG. 12, a first metal plate 6$a$ made of alloy, preferably with a high heat conductivity, for example a CuCl alloy, is first placed on a substrate.

On the surface of said plate 6$a$, a first metal substance 8$a$, referred to as the filling substance 6$a$, is positioned, defining spaces wherein the first metal conduits 10$a$ made of stainless steel, for example 316L stainless steel, arranged in parallel, are housed. In this instance, the substance 8$a$ is substantially identical to the substance 8 described above. It is nonetheless noted that the modularity of the method optionally makes it possible to vary the nature of the substance according to the application for which the exchanger system is intended.

At the ends of the conduits 10$a$, two bar-shaped connection elements 20$a$ are situated, for example one for the fluid inlet, and the other for the fluid outlet. Each of these bars 20$a$ is arranged at the end of the assembly 4$a$, in a substantially crosswise manner with respect to the main direction of the conduits 10$a$. As described above, each bar 20$a$ has a plurality of through orifices, equal in number to that of the conduits, since each end of a conduit 10$a$ is housed in one of the orifices, and welded therein.

Figure 12:
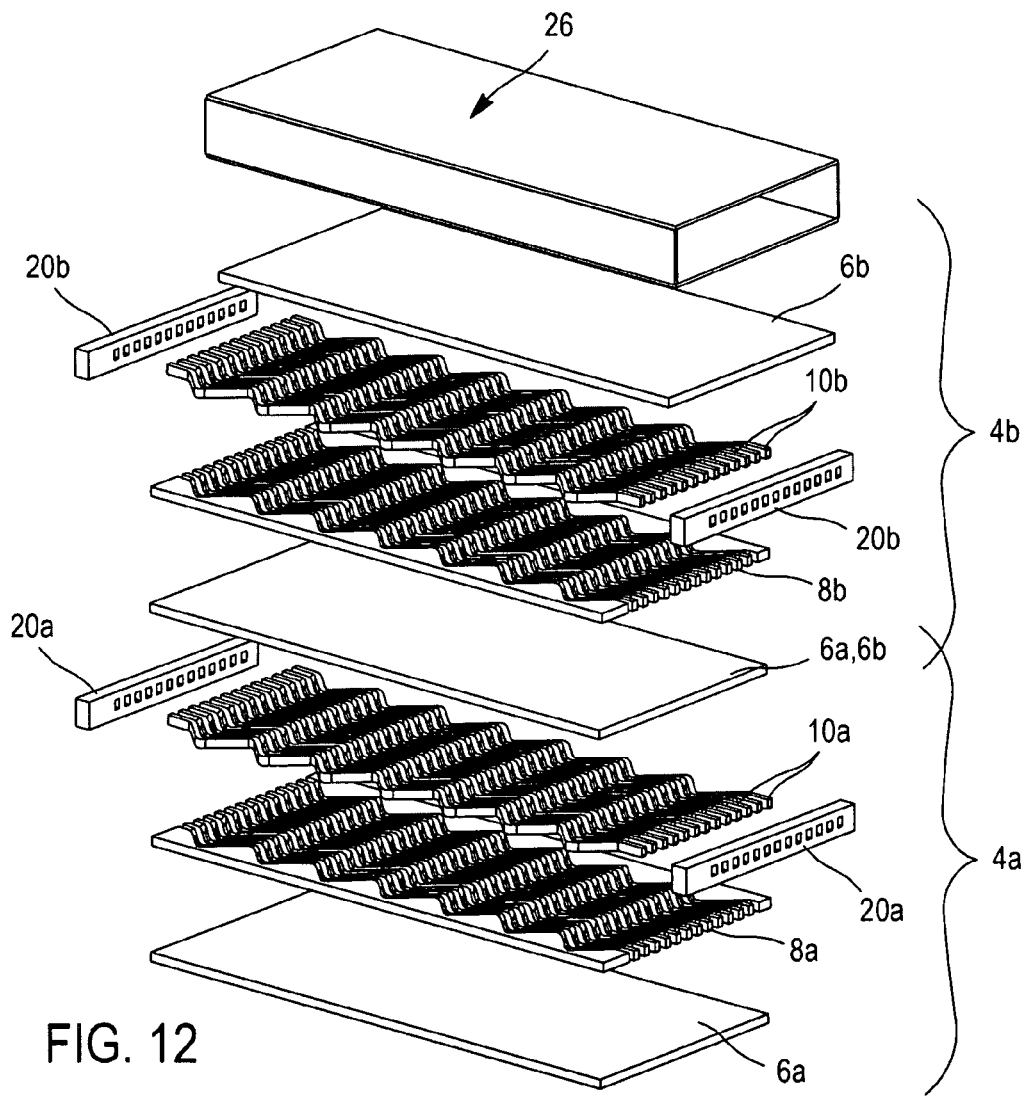
FIG. 12 represents an exploded perspective view of the two assemblies intended to form the modules in FIG. 11, prior to the treatment thereof.

The thickness of the conduits 10$a$ is substantially identical to that of the substance 8$a$, so that they jointly form a plane substrate surface of another plate 6$a$ substantially identical to the first, as shown in FIG. 12.

The stacking above the previous elements is continued so as to form the second assembly 4$b$, substantially identical to the first. This assembly 4$b$ thus comprises, in a manner equivalent to that of the first stack 4$a$, a second metal plate 6$b$, a second filling substance 8$b$ defining spaces wherein the second fluid circulation conduits 10$b$ arranged in parallel, two bar-shaped connection elements 20$b$, and a further second metal plate 6$b$ are arranged.

It is noted that two stacked bars 20a, 20b may alternatively be produced using a single bar, without leaving the scope of the invention.

As shown in FIG. 12, it may be arranged such that the uppermost first plate 6a in the stack and the bottommost second plate 6b in the stack consist of a single metal plate belonging simultaneously to both stacked assemblies 4a, 4b, and on either side of which the first and second conduits 10a, 10b are located.

As in the case of the single module described above, this stack of uniform thickness, consisting of the two assemblies 4a, 4b, is then inserted into a consolidation casing 26, closed over 360°, the inside whereof has a complementary shape to that of the abovementioned stack.

In order to obtain the diffusion welding of all the elements in contact, a treatment is then carried out consisting of hot isostatic compression, as described above, making it possible to obtain the two stacked rigidly connected modules 1a, 1b.

One or a plurality of joining channels may also be provided on these modules, so as to carry out fluid reversals. These joining channels are preferably of the type described above.

Figure 13:
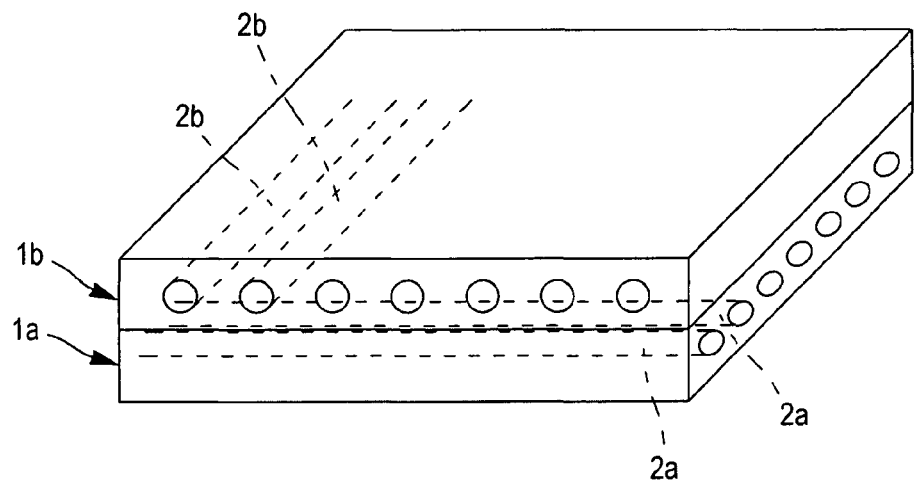
FIG. 13 represents an alternative embodiment for the two modules.

This case in which the two modules 1a, 1b are stacked may be carried out with the first and second channels 2a, 2b parallel, as shown in FIG. 11, or alternatively with the first channels 2a substantially orthogonal to the second channels 2b, as shown in FIG. 13. The latter design provides a so-called intersecting flow of the fluids passing through the two modules respectively. It is obtained easily by arranging the conduits 10a, 10b suitably in the respective stacked assemblies thereof.

While all these examples relate to applications wherein two separate fluids are to be circulated in the two modules 1a, 1b, respectively, it can also be envisaged to only circulate a single fluid in these modules, in all or only some of the channels 2a, 2b.

Figure 14:
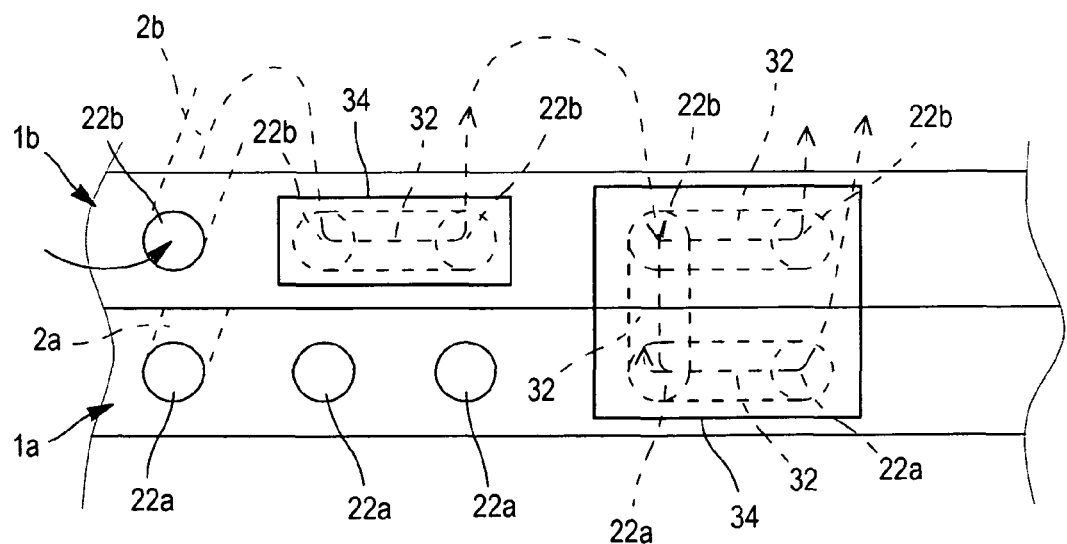
FIG. 14 represent schematic views of the step for forming one or a plurality of joining channels between the channels of the two modules.

In the example in FIG. 14, the fluid is introduced into the module 1b via the leftmost orifice 22a thereof in the figure. It may then undergo one or a plurality of reversals using joining channels 32 obtained by machining and closing plates 34, while remaining in the channels 2b of the second module 1b. If it is decided to circulate same simultaneously in one of the second channels 2b and the first channel 2a stacked thereon, a joining channel 32 is produced between the two orifices 22a, 22b in question, preferably in a manner similar to that adopted to produce the joining channels 32 in a single module. A closing plate 34 is then arranged so as to seal this joining channel 32, thus extending along the stacking direction of the elements giving rise to the formation of the modules. In the case shown in FIG. 14, each of the two orifices 22a, 22b also has an associated joining channel 32 for reversing the fluid in the channel directly following the associated module. In order to seal the three channels 32, a single plate 34 may cover all four orifices in question 22a, 22b. In this way, arriving via the leftmost orifice 22b of those covered by this plate 34, the fluid is distributed in parallel in the three other channels 2a, 2b, following the three joining channels 32 and the three orifices 22a, 22b. The reversed fluid then circulates in these three basic channels 2a, 2b in the same circulation direction.

As a general rule, any joining channel between any two orifices 22a, 22b of the same face of the module assembly may be envisaged.

Figure 15:
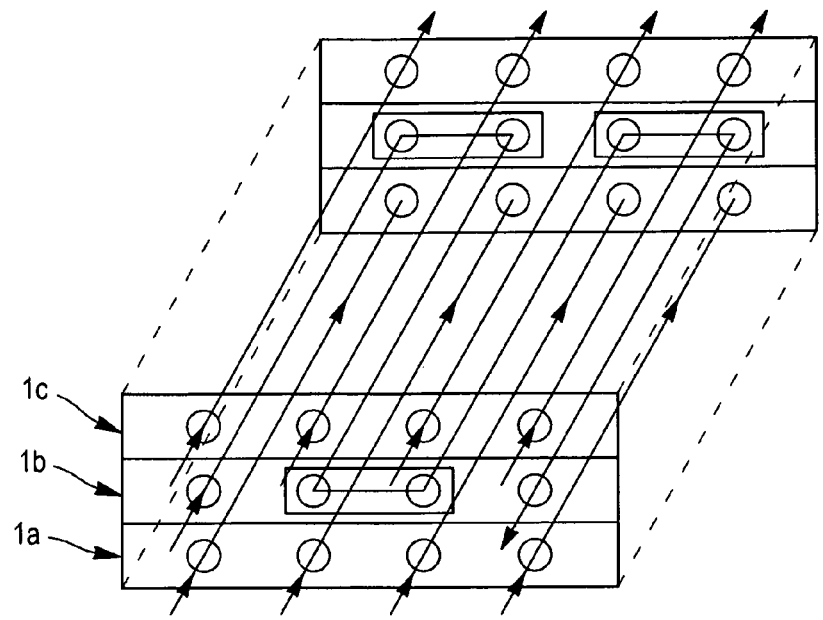
FIG. 15 represents a schematic view of a heat exchanger system obtained following the implementation of the method according to a further preferred embodiment of the present invention.

Naturally, the number of stacked modules may be greater than two, according to the requirements encountered. In the example in FIG. 15, three modules 1a, 1b, 1c are stacked, belonging to an exchanger/reactor. The intermediate module 1b is in this case preferably equipped with a catalyst, preferably on an insert, provided to carry out exothermic catalytic combustion, whereas the two other modules 1a, 1c arranged on either side thereof may be equipped with a catalyst, also on inserts, provided to carry out an endothermic catalytic reaction, a transfer of heat then being carried out completely between the intermediate module 1b and the end modules 1a, 1c. A reverse situation can also be envisaged, wherein the intermediate module 1b is equipped with a catalyst provided to carry out endothermic catalytic combustion, to extract the heat released by the exothermic catalytic combustion produced in the end modules 1a, 1c.

A single fluid may thus pass through the two end modules 1a, 1c, with a single inlet and outlet provided respectively on an intake line and an exhaust line. A further fluid circulates in the intermediate module 1b. Fluid reversals may be carried out, as shown for the intermediate module 1b in FIG. 15. Indeed, in this example, the fluid entering each channel of the end modules 1a, 1c is withdrawn from the associated module thereof from the outlet thereof from the channel, whereas in the intermediate module 1b, the fluid is introduced into one of the channels before undergoing a plurality reversals to follow all the other basic channels of the module, before being withdrawn therefrom.

In this type of module assembly, liable to be obtained using the method described with reference to the above figures, the orientation of the channels of the various modules may also be adapted according to the requirements encountered.

Figure 16:
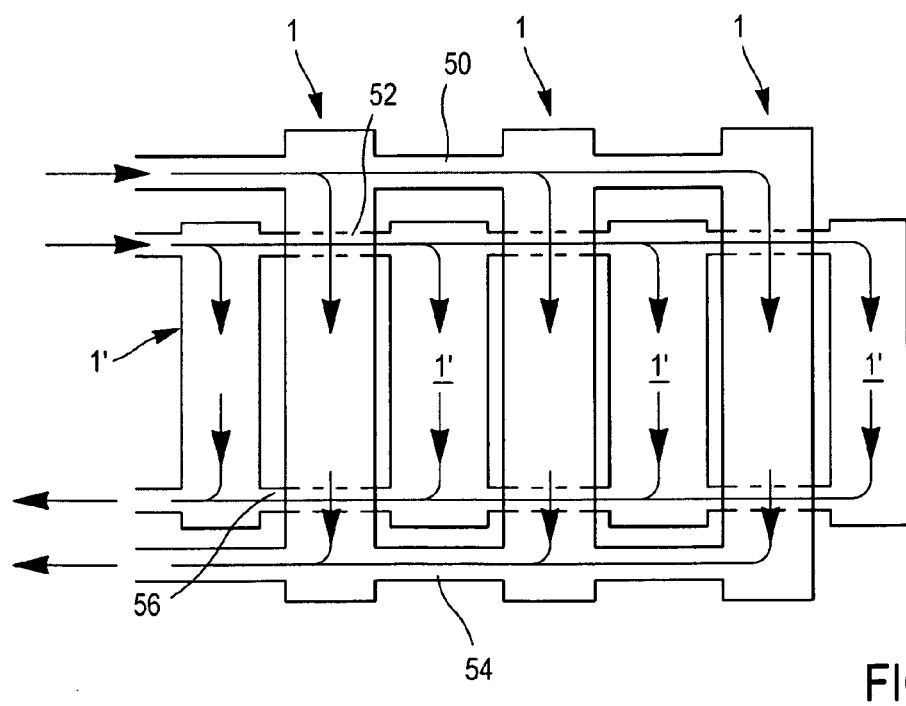
FIG. 16 represents a schematic view of a heat exchanger system obtained following the implementation of the method according to a further preferred embodiment of the present invention.

Finally, FIG. 16 shows a further alternative wherein the exchanger/reactor comprises in alternation, modules 1 and modules 1', the first being intended to be the site of an exothermic catalytic reaction and the second being intended to be the site of an endothermic catalytic reaction, or conversely. Preferably, it is envisaged that the modules 1 are obtained by means of a method as described above, whereas the modules 1' have a more conventional design, such as plates known to those skilled in the art. In the exemplified embodiment, the distribution line 50 supplies the modules 1 with a first fluid, whereas a further distribution line 52 supplies the modules 1' with a second fluid. Furthermore, an exhaust line 54 retrieves the first fluid from the modules 1, whereas a further exhaust line 56 retrieves the second fluid from the modules 1'.

With reference to the following figures, a further preferred embodiment for obtaining the module 1 shown in FIG. 1 can be seen.

Figure 17:
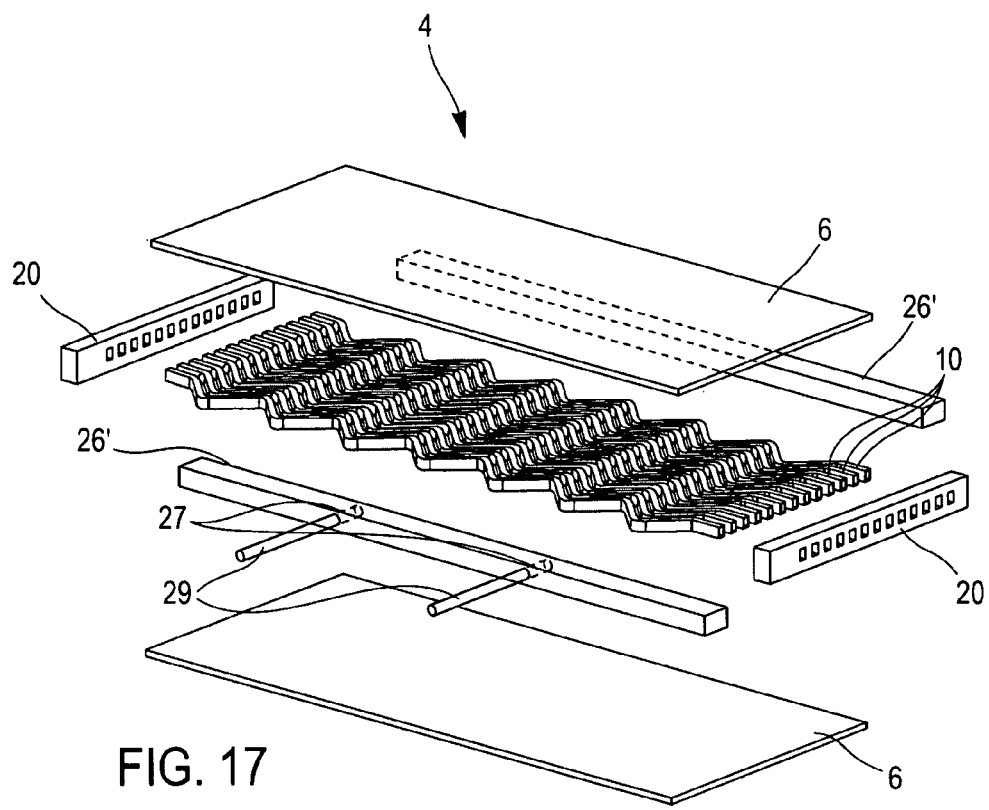
FIGS. 17 to 22 represent a production method according to a further embodiment of the present invention, at various stages of the implementation thereof.
Figure 18:
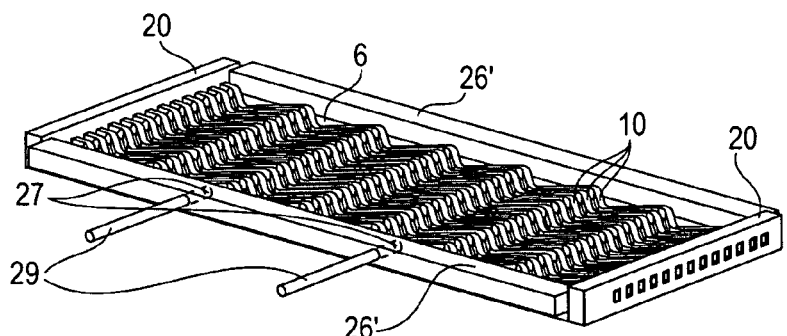

In FIG. 17, an assembly 4 of stacked elements, similar to that shown in FIG. 2, is shown, in that the consolidation casing has been removed and replaced by two side blocks 26' arranged respectively on either side of the plurality of conduits 10. These two strip-shaped blocks 26', are positioned so as to press on each of the two plates 6 (the upper plate having been omitted in FIG. 18 for the purposes of clarity), and form in conjunction with the connection elements 20 a quadrilateral surrounding the plurality of conduits 10.

One of the two blocks 26' is perforated with two orifices 27 enabling access inside the space wherein the plurality of conduits are situated, each equipped with a tube 29. These tubes and orifices particularly serve for the subsequent insertion of the powder forming the metal filling substance, since such a substance is not initially envisaged in the assembly 4.

Figure 19:
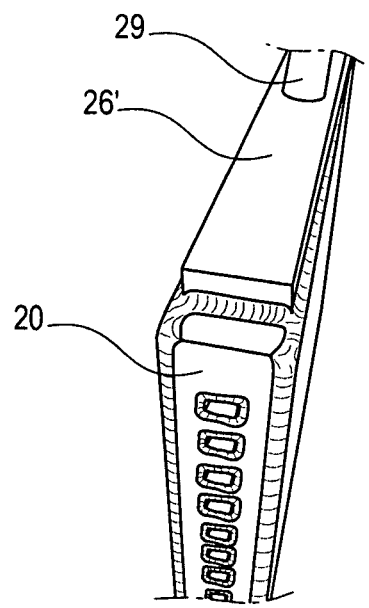

Indeed, a welding step, preferably TIG welding, between the constituent elements of the assembly 4 is first carried out, as shown in FIG. 19. For this purpose, the ends of the conduits are welded onto the connection elements 20, in turn welded onto the blocks 26' and the plates 6, the latter being also welded onto the blocks 26'.

Figure 20:
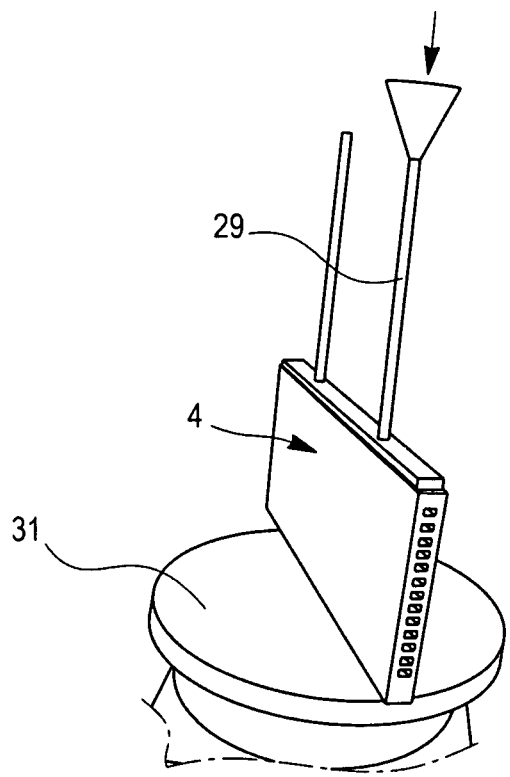

As shown in FIG. 20, powder is then inserted via one of the tubes 29 in the enclosed space defined by the elements 6, 20,

26', in order to fill the gaps left free between the conduits. This powder thus forms the metal filling substance, and, to ensure the best possible distribution in the space, the assembly 4 is positioned vertically on a vibrating table 31.

Figure 21:
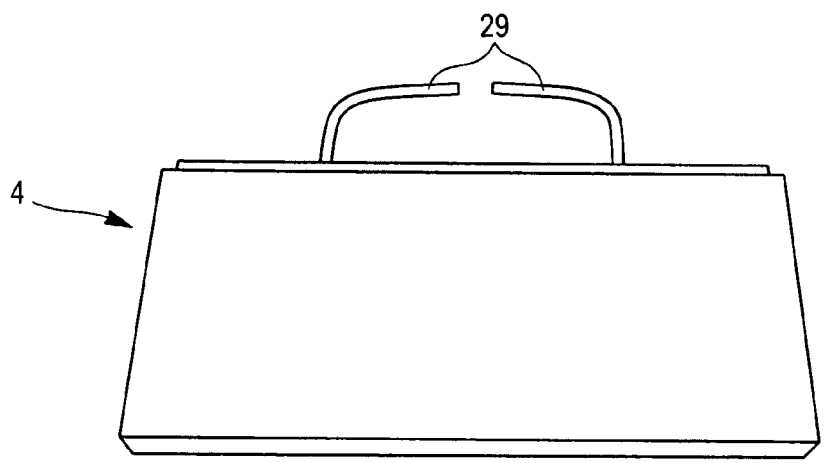

A vacuum is then applied on the assembly 4, for almost 12 hours, also using tubes 29 which are subsequently sealed, and bent as shown in FIG. 21 before the assembly 4 undergoes the hot isostatic compression step. This may be implemented according to the following protocol:

| Time (hrs) | Pressure (bar) | Temperature (° C.) |
|---|---|---|
| 0 | 1 | 20 |
| 3 | 1200 | 1000 |
| 3.5 | 1400 | 1040 |
| 5.5 | 1400 | 1040 |
| 8.5 | 1 | 20 |

After the hot isostatic compression step, the deformations observed on the outer surfaces of the assembly 4 can be reconditioned by machining.

Figure 22:
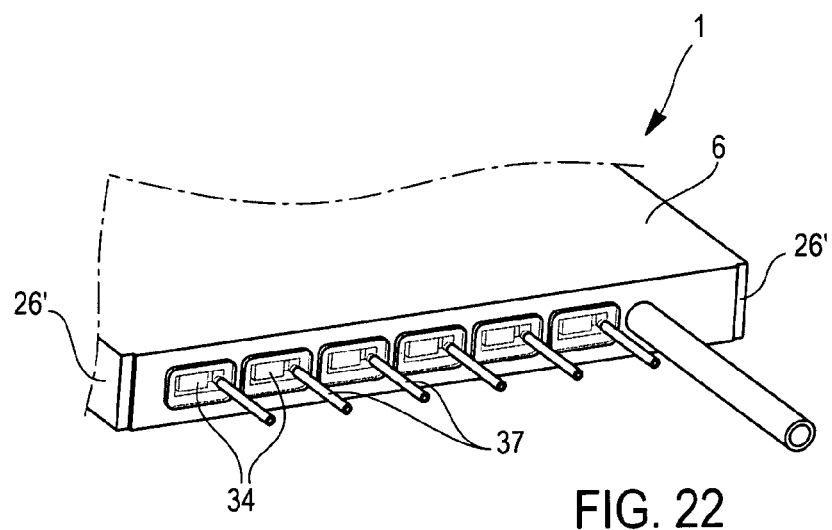

Closing plates 34 are then positioned on the element 20 in an equivalent manner to that described above with reference to FIGS. 8 and 9. In this way, FIG. 22 shows the module 1 obtained with closing plates 34 each connecting two directly consecutive conduits, in order to connect same in series. The fluid passing through the module can thus enter the first conduit and only come out of the last conduit.

In this instance, each closing plate 34 is equipped with a conduit 37 connecting with the joining channel defined, said conduit enabling the insertion of a thermocouple to monitor the temperature.

Obviously, various modifications may be made by those skilled in the art to the invention described above, merely as non-limitative examples. In particular, all the features described are suitable for application to any preferred embodiment envisaged.

The invention claimed is:

1. Method for producing a heat exchanger system comprising at least one module (1) traversed by a row of fluid circulation channels (2), the embodiment of said module being implemented as follows:
    formation of an assembly (4) comprising, in parallel, a plurality of metal conduits (10) each forming, with the inner space (16) thereof, one of said fluid circulation channels (2), said conduits being arranged between two metal plates (6, 6), and the spaces (17) defined by the directly consecutive conduits and said metal plates being filled by a metal filling substance (8), said assembly (4) also including two metal connection elements (20, 20), one being provided with a plurality of through orifices (22) respectively housing one of the two ends of the conduits, and the other being provided with a plurality of through orifices (22) respectively housing the other of the two ends of the conduits; and
    treatment of said assembly (4) so as to obtain diffusion welding of the conduits (10) with said metal filling substance (8), with said plates (6, 6), and with the two metal connection elements (20, 20);
    wherein material removal is carried out on one of the two metal connection elements (20) between two directly consecutive orifices (22), so as to create a joining channel (32) between these two orifices, and a closing plate (34) is positioned on said connection element (20) to seal said joining channel (32) between the two directly consecutive orifices.

2. Method according to claim 1, wherein said assembly (4) is embodied so as to also include a consolidation casing (26) wherein the rest of the assembly is inserted, and wherein the implementation of said treatment also results in the diffusion welding of said casing (26) with the rest of the assembly.

3. Method according to claim 1, wherein said heat exchanger system comprises, in one piece, at least one first and one second stacked modules (1a, 1b), respectively traversed by a row of first fluid circulation channels (2a) and by a row of second fluid circulation channels (2b), the embodiment of said first and second modules being implemented as follows:
    formation of a first assembly (4a) comprising, in parallel, a plurality of first metal conduits (10a) each forming, with the inner space thereof, one of said first fluid circulation channels (2a), said first conduits (10a) being arranged between two first metal plates (6a, 6a), and the spaces defined by the directly consecutive first conduits and said first metal plates being filled by a first metal filling substance (8a), and the formation of a second assembly (4b) comprising, in parallel, a plurality of second metal conduits (10b) each forming, with the inner space thereof, one of said second fluid circulation channels (2b), said second conduits (10b) being arranged between two second metal plates (6b, 6b), and the spaces defined by the directly consecutive second conduits and said second metal plates being filled by a second metal filling substance (8b), said second assembly being stacked on the first assembly with the first metal plate (6a) and the second metal plate (6b), situated between the first and second conduits consisting of the same plate; and
    simultaneous treatment of said first and second stacked assemblies (4a, 4b) so as to obtain diffusion welding of the first conduits (10a) with said first metal filling substance (8a) and said first plates (6a, 6a), and diffusion welding of the second conduits (10b) with said second metal filling substance (8b) and said second plates (6b, 6b).

4. Method according to claim 1, wherein said treatment is a hot isostatic compression.

5. Method according to claim 4, characterised in that said hot isostatic compression is carried out at a temperature of approximately 1040° C., at a pressure of approximately 1200 bar, for approximately 2 hours.

6. Method according to claim 1, characterised in the conduits (10) are made of stainless steel and the metal filling substance (8) and said plates (6, 6) of an alloy with a high heat conductivity.

7. Method according to claim 1, characterised in that said metal filling substance (8), before said assembly treatment step, is made of metal powder.

8. Method according to claim 1, characterised in that at least one of the fluid circulation channels (2) is equipped with an insert, preferably made of metal, coated at least partially with a catalyst enabling a catalytic chemical reaction inside said channel.

* * * * *